US012270393B2

(12) United States Patent
Conklin

(10) Patent No.: US 12,270,393 B2
(45) Date of Patent: Apr. 8, 2025

(54) PROVIDING BACKPRESSURE FOR ELECTRIC COMPRESSOR

(71) Applicant: Bendix Commercial Vehicle Systems LLC, Avon, OH (US)

(72) Inventor: Richard J Conklin, Bay Village, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 151 days.

(21) Appl. No.: 17/821,304

(22) Filed: Aug. 22, 2022

(65) Prior Publication Data

US 2024/0060486 A1 Feb. 22, 2024

(51) Int. Cl.
| | |
|---|---|
| F04B 49/22 | (2006.01) |
| B60T 17/00 | (2006.01) |
| F04B 7/00 | (2006.01) |
| F04B 35/04 | (2006.01) |
| F04B 37/12 | (2006.01) |
| F04B 39/08 | (2006.01) |
| F04B 39/10 | (2006.01) |
| F04B 39/16 | (2006.01) |
| F04B 49/06 | (2006.01) |
| F04B 49/08 | (2006.01) |

(Continued)

(52) U.S. Cl.
CPC .............. *F04B 49/22* (2013.01); *F04B 35/04* (2013.01); *F04B 39/16* (2013.01); *B60T 17/004* (2013.01); *F04B 7/0076* (2013.01); *F04B 37/12* (2013.01); *F04B 39/08* (2013.01); *F04B 39/10* (2013.01); *F04B 49/065* (2013.01); *F04B 49/08* (2013.01); *F04B 53/10* (2013.01); *F04B 53/20* (2013.01); *F04B 2203/0205* (2013.01)

(58) Field of Classification Search
CPC .......... F04B 49/22; F04B 35/04; F04B 39/16; F04B 7/0076; F04B 37/12; F04B 39/08; F04B 39/10; F04B 49/065; F04B 49/08; F04B 49/225; F04B 53/10; F04B 53/20; F04B 2203/0205; F04B 2205/06; B60T 17/004
See application file for complete search history.

(56) References Cited

U.S. PATENT DOCUMENTS

| | | | |
|---|---|---|---|
| 4,052,135 A | 10/1977 | Shoop | |
| 5,522,150 A * | 6/1996 | Schultz | ................. B60T 17/004 34/80 |

(Continued)

OTHER PUBLICATIONS

Bendix Commercial Vehicle Systems LLC, "Bendix AD-HF and AD-HFi Puraguard Oil Coalescing Air Dryer", SD-08-12046 Service Data Sheet, Jan. 31, 2022, 18 pages, Bendix Commercial Vehicle Systems LLC, Avon Ohio U.S.A.

*Primary Examiner* — David N Brandt
(74) *Attorney, Agent, or Firm* — Cheryl L. Greenly; Brian E. Kondas; Geoffrey A. Kudlo

(57) ABSTRACT

An air treatment system includes an electric compressor for compressing air, an air flow valve positioned in a delivery line downstream of the electric compressor, and an electropneumatic valve connected to the air flow valve. A controller having control logic receives a system pressure and activates the electropneumatic valve. The control logic activates the electropneumatic valve to provide a pneumatic control signal to the air flow valve to partially close the delivery line in response to the system pressure being greater than a first predetermined pressure.

4 Claims, 3 Drawing Sheets

(51) Int. Cl.
  *F04B 53/10* (2006.01)
  *F04B 53/20* (2006.01)

(56) References Cited

U.S. PATENT DOCUMENTS

| | | | |
|---|---|---|---|
| 5,592,754 A * | 1/1997 | Krieder | F04B 49/022 |
| | | | 34/80 |
| 7,441,789 B2 * | 10/2008 | Geiger | B60G 17/0523 |
| | | | 280/124.16 |
| 7,544,234 B2 * | 6/2009 | Fornof | B01D 53/0415 |
| | | | 96/147 |
| 8,777,246 B2 | 7/2014 | Meier | |
| 10,434,464 B2 | 10/2019 | Minato | |
| 10,960,724 B2 | 3/2021 | Meier | |
| 2008/0292471 A1 * | 11/2008 | Sweet | F04B 49/065 |
| | | | 417/32 |
| 2022/0065241 A1 | 3/2022 | Klatt | |
| 2022/0065421 A1 | 3/2022 | Klatt | |

* cited by examiner

PROVIDING BACKPRESSURE FOR ELECTRIC COMPRESSOR

BACKGROUND

The present application relates to a system, controller and method to provide backpressure to an electric compressor during operation of a commercial vehicle.

In commercial vehicle applications, compressed air is necessary for the pneumatic braking systems and other air controlled systems on the vehicle. If an electric compressor is used, the electric compressor has its own motor so that it can be active only when compressed air is needed. However, if an electric compressor is not run for long periods because the air usage on the vehicle is low, water can condense in the discharge air lines and in the lubricating oil. Therefore, there is interest in maintaining a balance between activating the electric compressor only when necessary and preventing deleterious water condensation in the air supply system.

SUMMARY

In accordance with one embodiment, an air treatment system includes an electric compressor for compressing air, an air flow valve positioned in a delivery line downstream of the electric compressor, and an electropneumatic valve connected to the air flow valve. A controller having control logic receives a system pressure and activates the electropneumatic valve. The control logic activates the electropneumatic valve to provide a pneumatic control signal to the air flow valve to partially close the delivery line in response to the system pressure being greater than a first predetermined pressure.

In accordance with another embodiment, a method for controlling an air treatment system includes activating an electric compressor until a system pressure is greater than a cut-out pressure and closing an air flow valve connected to a discharge line of the electric compressor in response to the system pressure, such that a backpressure develops in the discharge line. The method further includes deactivating the electric compressor in response to a compressor temperature reaching a predetermined internal temperature.

DETAILED DESCRIPTION

Figure 1:
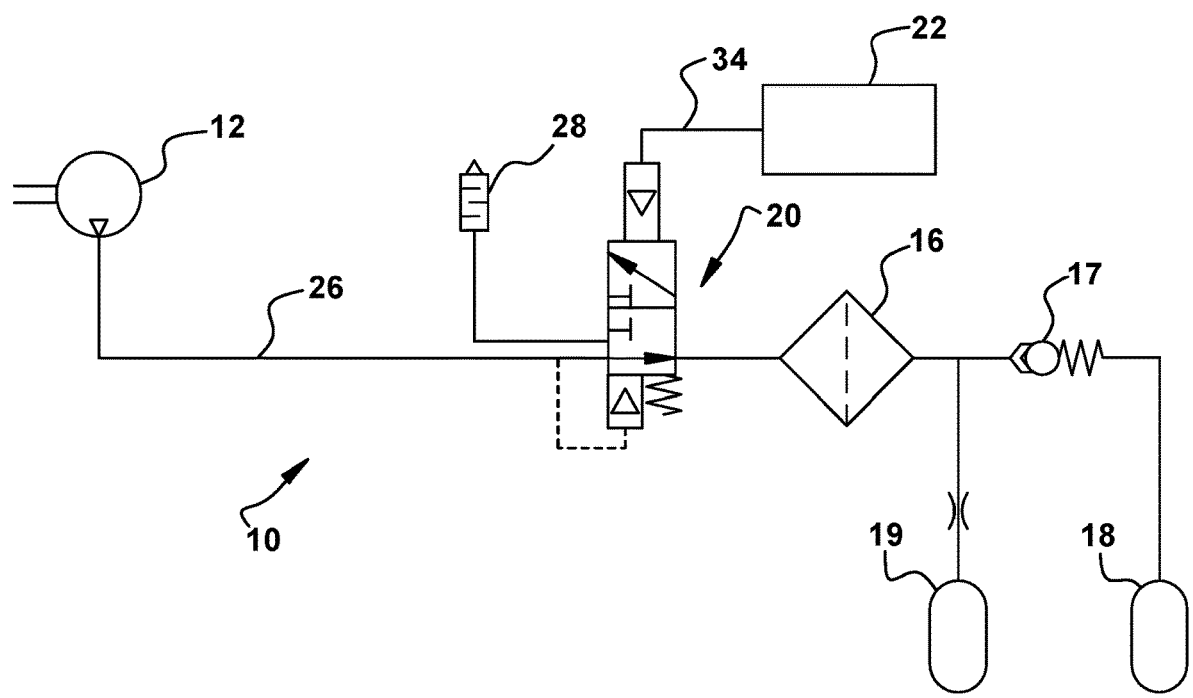
FIG. 1 is an ISO representation of an air charging system having the features of this invention.

FIG. 1 shows an ISO representation of the operation of an air system 10 according to the present invention. The air system 10 may be used to compress, treat and store air for an air brake system on a commercial vehicle.

An electric compressor 12 is used to compress atmospheric air. The electric compressor 12 is connected by a delivery air line 26 to an air flow valve 20.

Air flow valve 20 is normally open such that the delivery air passes downstream to a desiccant cartridge 16. The delivery air is dried, and contaminants are removed as the air passes through the desiccant cartridge 16. The delivery air then enters a purge reservoir 19. The air stored in the purge reservoir 19 is used to regenerate the desiccant cartridge 16 during a purge cycle. When the purge reservoir 19 has reached a predetermined pressure, the delivery air passes through a check valve 17 to a reservoir 18. Reservoir 18 provides the supply air for components of the air brake system.

When closed, the air flow valve 20 communicates the delivery air to an exhaust port 28. The exhaust port 28 may be connected to atmosphere.

The air flow valve 20 receives a pneumatic signal from an electropneumatic valve, such as a solenoid valve 22. The pneumatic signal is generated when the features of this invention are to be implemented in order to provide backpressure on the delivery air line 26 and to limit condensation during low air usage times.

In response to the pneumatic signal from the solenoid valve 22, the air flow valve 20 moves in proportion so as to reduce the flow of the delivery air downstream into the desiccant cartridge 16. Partial closure of the air flow valve 20 is possible. A portion of the delivery air is exhausted to atmosphere through the exhaust port 28. In this manner, the electric compressor 12 is provided with backpressure on the delivery air line 26 as the electric compressor 12 remains activated. The electric compressor 12 can be run to maintain a minimum heat level within the electric compressor 12 to limit water condensation. The compressed air can continue to remain in the delivery air line 26 without damaging downstream components with overcharged air. In addition, the expense of installing a separate overflow control valve in the delivery air line 26 is eliminated.

Figure 2:
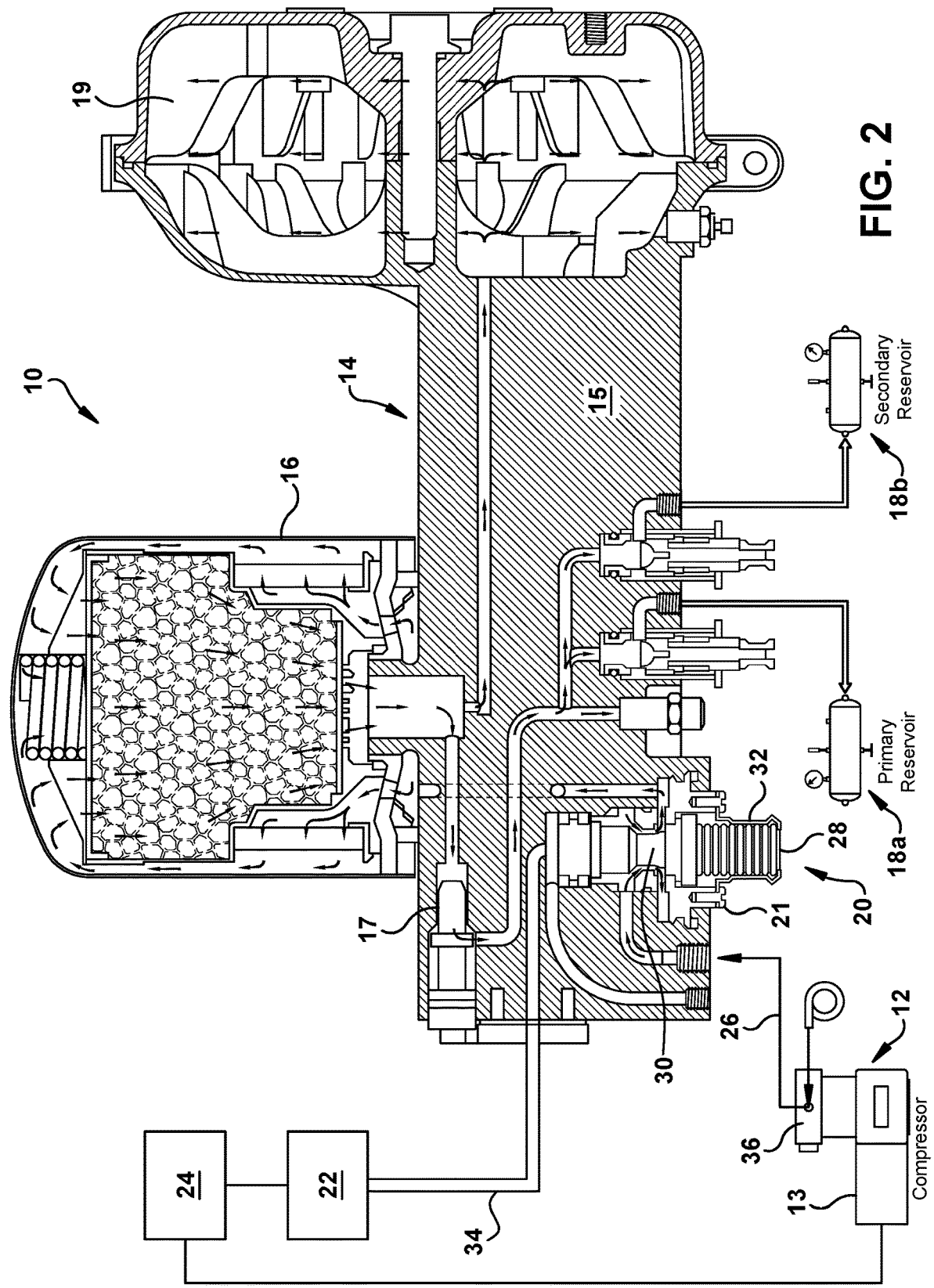
FIG. 2 is a representation of an implementation of the air charging system as in FIG. 1.

Referring to FIG. 2, the air system 10 according to one example of the invention is depicted. The air system 10 includes the electric compressor 12. The electric compressor 12 includes a motor 13, which may be integrated or mounted separately from the electric compressor 12. The electric compressor 12 may be a scroll type, a rotary vane type or a screw type. A temperature sensor 36 may be connected to internal to the body of the electric compressor 12 to measure the heat generated by the electric compressor 12.

The electric compressor 12 is connected via a delivery air line 26 to an air dryer 14. The air dryer 14 may be an AD-HFi™ air dryer from Bendix Commercial Vehicle Systems LLC of Avon Ohio. The air dryer 14 includes a body 15. The body 15 receives the desiccant cartridge 16. The body 15 may receive the purge reservoir 19. The body 15 includes a check valve 17 between the purge reservoir 19 and ports connected to a primary reservoir 18a and a secondary reservoir 18b. This check valve 17 prevents air from reservoirs 18a, 18b from being used for a purge cycle.

In this example, the body 15 has the air flow valve 20 integrated. The air flow valve 20 may be integral to the body 15 by fitting into a cavity 21. Alternatively, the air flow valve 20 may be stand alone and pneumatically connected to the air dryer 14 and electric compressor 12.

Air flow valve 20 receives the delivery air from the compressor 12. Air flow valve 20 includes a tapered piston 30 that is slidable in the cavity 21. A spring 32 maintains the tapered piston 30 in the normally open position to allow the delivery air to flow to downstream components. The tapered piston 30 is made of a metallic material to withstand the high heat and high pressure of the delivery air. Under normal operating conditions, all of the delivery air passes through the normally open air flow valve 20 to the desiccant cartridge 16 then to the purge reservoir 19 and reservoirs 18a, 18b.

The air flow valve 20 is configured to receive a control signal at the top of the tapered piston 30. The control signal may come from an electropneumatic device, such as the solenoid valve 22. Solenoid valve 22 may be a normally closed solenoid. The solenoid valve 22 receives air from the primary reservoir 18a and receives an electronic control signal from a controller 24. When the controller 24 activates the solenoid valve 22, air passes through the solenoid valve 22 from the primary reservoir 18a to the top of tapered piston 30. The tapered piston 30 moves against the bias of the spring 32 to slowly close the path for the delivery air around the tapered piston 30. The delivery air then is diverted to the exhaust port 28 of the valve 20. The exhaust port 28 is connected to atmosphere.

In one example, the pneumatic signal delivered by the solenoid valve 22 over air line 34 can be variable, such that the air flow valve 20 would respond by closing further and thereby increasing the back pressure as the pneumatic signal increases in pressure.

As the air enters the top of the tapered piston 30, a purge cycle concurrently begins since the full pressure of the delivery air is no longer flowing to the desiccant cartridge 16. When the pressure in the purge reservoir 19 is greater than the delivery air pressure, reverse flow of air through the desiccant cartridge 16, called a purge cycle, begins. The air from the desiccant cartridge 16 also passes through to the exhaust port 28.

In another example, the air flow valve 20 can be set to keep pressure in the delivery air line 26 while the electric compressor 12 is deactivated. The air flow valve 20 remains closed to maintain a pressure greater than zero in the delivery air line 26.

The controller 24 may include functionality for controlling the electric compressor according to algorithms developed for electronic air control or may be a separate controller for the present functions. The controller 24 may receive the temperature information from the temperature sensor 36 in determining the duration of operation of the electric compressor 12 in certain situations. For example, the controller 24 may deactivate the electric compressor 12 when a temperature value as received from the temperature sensor 36 exceeds a predetermined temperature value. The controller 24 also receives system pressure information from a pressure sensor (not shown) in reservoirs 18a, 18b.

In another example, the controller 24 and solenoid valve 22 can be replaced with a mechanical governor that responds to the pressure in the primary reservoir 18a to provide the pneumatic signal directly to the air flow valve 20 when the pressure is greater than a cut-out pressure.

Therefore, an air treatment system includes an electric compressor for compressing air, an air flow valve positioned in a delivery line downstream of the electric compressor, and an electropneumatic valve connected to the air flow valve. A controller having control logic receives a system pressure and activates the electropneumatic valve. The control logic activates the electropneumatic valve to provide a pneumatic control signal to the air flow valve to partially close the delivery line in response to the system pressure being greater than a first predetermined pressure.

Figure 3:
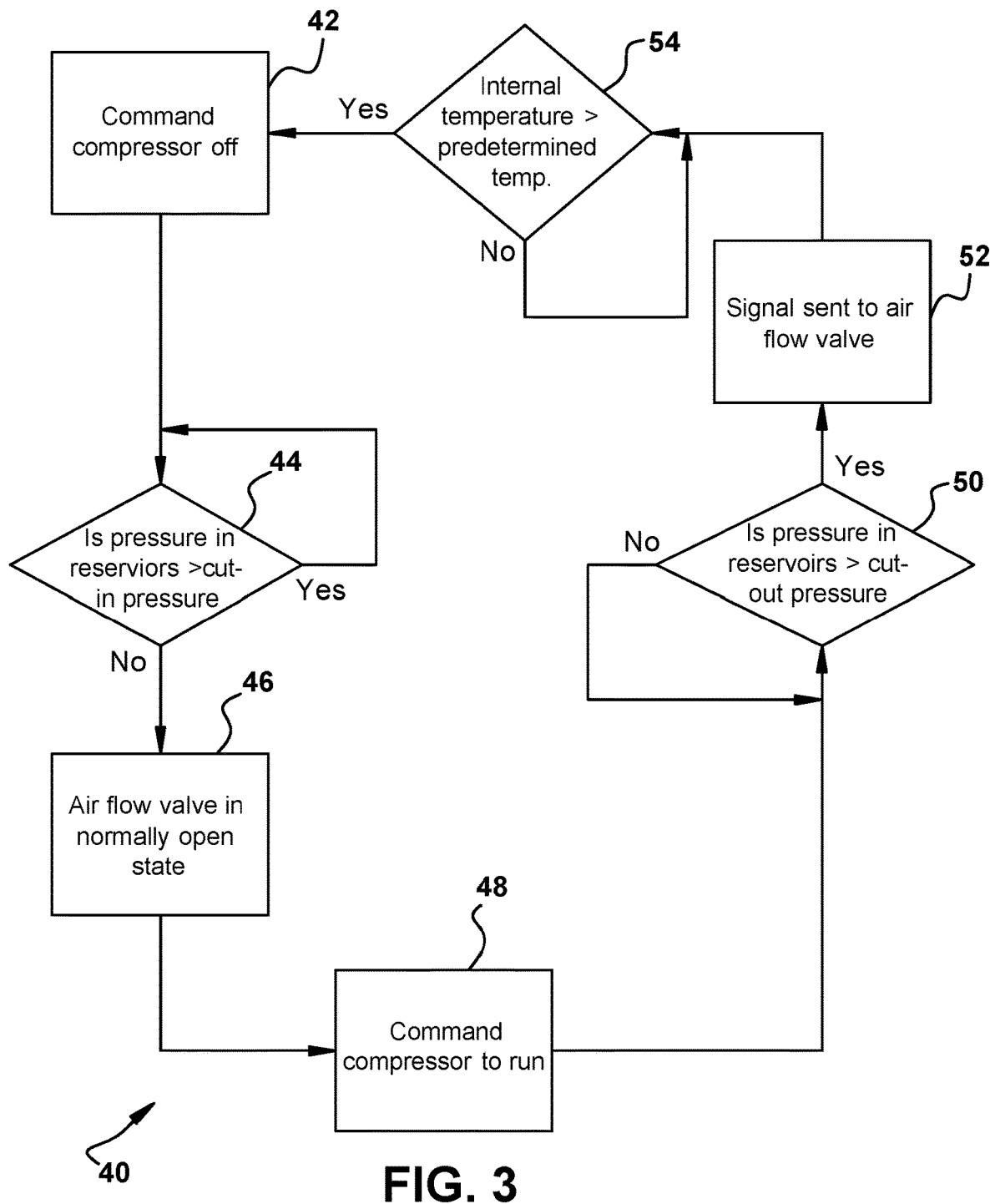
FIG. 3 is a method of implementing the air charging system.

FIG. 3 shows the method 40 of implementing the presently claimed invention in the controller 24. In this example, the controller 24 includes the electronic air control functionality.

In step 42, the compressor 12 begins in the off state.

In step 44, the pressure in the primary reservoir 18a and secondary reservoir 18b, known as system supply pressure, is measured. A pressure sensor, a pressure switch or other means of measuring pressure in the reservoir may be used. If the system supply pressure is greater than a first predetermined pressure, the electric compressor 12 will remain deactivated. If the system supply pressure is less than or equal to the first predetermined pressure, the method 40 continues to step 46. In one example, the first predetermined pressure is a cut-in pressure. In another example, the first predetermined pressure is about 105 psi.

In step 46, any control signal present to the air flow valve 20 is deactivated and vented to atmosphere. The air flow valve 20 is reset to the normally open mode to allow delivery air to pass around the piston 30.

In step 48, the controller 24 sends a signal to the electric compressor 12 so it will begin to deliver compressed air to the air dryer 14.

In step 50, the system supply pressure is again measured in the primary reservoir 18a and the secondary reservoir 18b. If the system supply pressure is less than or equal to a second predetermined pressure, the electric compressor 12 will continue to compress air. No change is made to operation of the air flow valve 20. If the system supply pressure is greater than the second predetermined pressure, the method 40 continues to step 52. In one example, the second predetermined pressure is a cut-out pressure. In another example, the second predetermined pressure is about 125 psi.

In step 52, the control signal is delivered to the head of the piston 30 of the air flow valve 20. In one example, the same control signal also indicates that a purge cycle of the air dryer 14 should begin. The piston 30 of the air flow valve 20 begins to move against the bias of the spring 32 and closes the air delivery line 26. The delivery air then begins to be diverted to the exhaust port 28. In this mode, the electric compressor 12 can be run but the pressure in the primary reservoir 18a and secondary reservoir 18b will not exceed the cut-out pressure.

In one example, the method 40 continues to step 54 where the temperature of the compressor 12 is measured. The temperature may be from the internal temperature sensor 36. If the internal temperature has not yet reached a predetermined temperature, the method 40 remains at step 54 with the electric compressor 12 remaining activated and the control signal delivered to the air flow valve 20 to keep the delivery air diverted to the exhaust port 28. If the internal temperature of the compressor 12 is greater than a predetermined temperature, the method 40 repeats at step 42 to deactivate the electric compressor 12.

Therefore, the method for controlling an air treatment system includes activating an electric compressor until a system pressure is greater than a cut-out pressure and closing an air flow valve connected to a discharge line of the electric compressor in response to the system pressure, such that a backpressure develops in the discharge line. The method further includes deactivating the electric compressor in response to a compressor temperature reaching a predetermined internal temperature.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An air treatment system comprising: an electric compressor for compressing air; an air flow valve positioned in a delivery line downstream of the electric compressor; an electropneumatic valve connected to the air flow valve; an air dryer downstream of the electric compressor and connected via the delivery line to the electric compressor, wherein the air flow valve is positioned in the delivery line pneumatically between the electric compressor and the air dryer; and a controller having control logic for receiving a system pressure and activating the electropneumatic valve, wherein the control logic activates the electropneumatic valve to provide a pneumatic control signal to the air flow valve to partially close the air flow valve in response to the system pressure being greater than a first predetermined pressure, whereby compressed air remains in a portion of the delivery line between the compressor and the air flow valve while the electric compressor is activated and in a portion of the delivery line between the air flow valve and the air dryer is exhausted to atmosphere.

2. The air treatment system as in claim 1, wherein the air flow valve is integrated with the air dryer.

3. The air treatment system as in claim 1, wherein the control logic further operates a purge control of the air dryer and the air flow valve simultaneously.

4. The air treatment system as in claim 1, further comprising:
a temperature sensor connected to the electric compressor and transmitting a temperature signal to the controller, wherein the control logic maintains the electric compressor as active while the temperature sensor is reading a temperature internal to the electric compressor less than a predetermined temperature.

* * * * *